United States Patent [19]

Pettigrew et al.

[11] Patent Number: 4,567,229

[45] Date of Patent: Jan. 28, 1986

[54] ARYLOXY-ALKOXY SUBSTITUTED POLYPHOSPHAZENES

[75] Inventors: F. Alexander Pettigrew; Harold R. Penton, both of Baton Rouge, La.

[73] Assignee: Ethyl Corporation, Richmond, Va.

[21] Appl. No.: 683,028

[22] Filed: Dec. 18, 1984

[51] Int. Cl.[4] .............................................. C08G 79/04
[52] U.S. Cl. ..................................... 524/610; 524/406; 524/419; 524/423; 524/424; 524/434; 524/435; 524/442; 524/445; 524/447; 524/449; 524/450; 524/451; 524/452; 524/456; 528/168
[58] Field of Search ................ 528/168; 524/610, 406, 524/419, 423, 424, 434, 435, 442, 445, 447, 449, 450, 451, 452, 456

[56] References Cited

U.S. PATENT DOCUMENTS

| 3,370,020 | 2/1968 | Allcock et al. | 528/168 |
| 3,700,629 | 10/1972 | Reynard et al. | 528/168 |
| 3,732,175 | 5/1973 | Allcock | 528/168 |
| 3,856,712 | 12/1974 | Reynard et al. | 528/168 |
| 3,970,533 | 7/1976 | Kyker et al. | 204/159.14 |
| 4,116,785 | 9/1978 | Cheng | 204/159.14 |
| 4,128,710 | 12/1978 | Fieldhouse et al. | 528/168 |
| 4,221,900 | 9/1980 | Hergenrother et al. | 528/168 |
| 4,446,295 | 5/1984 | Shibuta et al. | 528/168 |

Primary Examiner—Lester L. Lee
Attorney, Agent, or Firm—Donald L. Johnson; John F. Sieberth; Joseph D. Odenweller

[57] ABSTRACT

Polyphosphazenes containing 20–80 mole percent phenoxy, 20–80 mole percent alkylphenoxy and 2–30 mole percent alkoxy substituents possess low glass transition temperature while still exhibiting good smoke values in standard tests.

12 Claims, No Drawings

ARYLOXY-ALKOXY SUBSTITUTED POLYPHOSPHAZENES

BACKGROUND OF THE INVENTION

Polyphosphazenes are polymers containing a plurality of —P<=N— units wherein substituents are bonded to the phosphorus atoms. The properties of the polymer are largely governed by the nature of the phosphorus substituents. These substituents can vary widely and include among others, aryloxy, alkaryloxy, arylalkoxy, alkoxy, aminoaryloxy, nitroaryloxy, alkenoxy, alkenylaryloxy, halo, amino, alkylamino, dialkylamino, aryl, alkaryl, alkyl, aralkyl and the like including all combinations thereof. The polyphosphazenes which are the concern of the present invention are high molecular weight substantially linear polyphosphazenes which contain from about 100 up to 1,000,000 or more of the above units.

Polyphosphazenes which are substituted with phenoxy, alkylphenoxy and large amounts of alkoxy are known. Reynard et al., U.S. Pat. No. 3,856,712 describes such polymers in which 40–80 mole percent of the phosphorus substituents are alkoxy. Although such polymers have low glass transition temperatures (Tg), it has been found that they are relatively high smoke generators in standard smoke tests. Since one of the most important uses of polyphosphazene compositions is in applications where smoke generation during fires can be hazardous, a need exist for a polyphosphazene with low-smoke properties which still exhibit an acceptably low Tg.

SUMMARY OF THE INVENTION

It has now been discovered that polyphosphazenes that are substituted with phenoxy, alkylphenoxy and a low level of alkoxy groups possess low Tgs and at the same time have acceptably low smoke properties.

DESCRIPTION OF THE PREFERRED EMBODIMENTS

A preferred embodiment of the invention is a cured polyphosphazene composition having a non-flaming smoke rating below about 200Dm as measured by the AMSI/ASTM E 662-79 method on a test specimen 76 mills thick, said composition comprising a cured polyphosphazene gum containing about 30–120 parts by weight of inorganic filler for each 100 parts of polyphosphazene and optionally other conventional compounding ingredients, said polyphosphazene gum having a —P<=N)$_n$ backbone in which n has an average value of about 100–1,000,000 or more and the phosphorus substituents prior to cure comprise about 20–80 mole percent phenoxy, 20–80 mole percent lower alkylphenoxy and 2–30 mole percent alkoxy and said substituents are randomly distributed along said backbone.

In a more preferred embodiment of the invention, the phosphorus substituents are about 30–70 mole percent phenoxy, 30–70 mole percent alkylphenoxy and 10–25 mole percent alkoxy.

The preferred alkylphenoxy groups are those in which the alkyl is a lower alkyl, that is an alkyl containing about 1–4 carbon atoms. The preferred alkyl substituent is ethyl. The more preferred alkylphenoxy groups are the p-alkylphenoxy groups. The most preferred alkylphenoxy group is p-ethylphenoxy.

Although any alkoxy substituent can be used, the preferred alkoxy substituents are those which contain about 1–8 carbon atoms such as methoxy, ethoxy, propoxy, butoxy, isobutoxy, n-pentoxy, isopentoxy, n-hexoxy, 2-ethylhexoxy and the like including mixtures thereof.

The high molecular weight substantially linear polyphosphazenes of the invention are made by the proper substitution of a substantially linear polyphosphonitrilic chloride. These in turn are made by the reaction of a stoichiometric excess of ammonium chloride with phosphorus pentachloride in an inert solvent such as monochlorobenzene at about 120°–130° C. This produces a mixture of cyclic phosphonitrilic chloride that is about 80% trimer. The trimer is purified by crystallization or distillation or both and the purified trimer is polymerized by heating in a sealed vessel under vacuum or an inert atmosphere at about 220°–250° C. for about 8–24 hours. Preferably a small amount of catalyst such as is described in U.S. Pat. No. 4,123,503 or U.S. Pat. No. 4,226,840 is included. The linear polymer is then recovered by dissolving in a solvent such as cyclohexane, toluene or tetrahydrofuran followed by precipitation by addition of a non-solvent such as heptane. Low molecular weight oligomer and trimer will remain in solution. The coagulated linear polyphosphonitrilic chloride is then substituted by reacting a solution of the polyphosphonitrilic chloride with a solution of sodium aryloxides and alkoxides containing the proper ratio of phenoxide, alkylphenoxide, alkoxide and optionally alkenylphenoxide. Tetrahydrofuran (THF) is a preferred solvent. In a more preferred embodiment, a solution of the phosphonitrilic chloride is first reacted with the desired amount of sodium aryloxide and then with the sodium alkoxide.

The ratio of each substituent can be controlled by using the proper number of equivalents of each aryloxide and alkoxide. For example, if the polyphosphonitrilic chloride solution contains 100 equivalents of replacable chlorine, then the solution should be reacted with about 20–80 equivalents of sodium phenoxide, 20–80 equivalents of sodium alkylphenoxide, and 2–30 equivalents of sodium alkoxide and optionally up to 20 equivalents of sodium alkenylphenoxide selected such that the total number of equivalents is about 100–110.

The solution is then neutralized with an acid such as sulfuric acid. It is then poured into aqueous isopropanol to coagulate the gum. The gum is purified by re-dissolving in tetrahydrofuran and again coagulated by pouring into methanol. The substituted polyphosphazene precipitates in the form of white crumbs and is separated and dried under vacuum.

The following examples illustrate the preparation of the alkoxy-substituted polyaryloxy phosphazenes of the present invention.

EXAMPLE 1

In a 5 liter stainless steel autoclave was placed 530.1 grams of a 20.7 weight percent solution of poly(dichloro)phosphazene (109.7 grams, 1.89 gram equivalents) in cyclohexane, 525 grams of a solution of sodium phenoxide (1022 meq) and sodium p-ethylphenoxide (836 meq) in tetrahydrofuran (THF). There was also added 130.4 grams of a n-butanol solution of sodium n-butoxide (228 meq) and 1841 grams of cyclohexane. The autoclave was pressurized to 100 psig with nitrogen and heated to 150° C. The contents were stirred at this temperature for 16.5 hours at which time the autoclave was cooled and the contents removed. The solution was acidified with sulfuric acid to pH 2 and 4.76 grams of a commercial antioxidant (Ethanox ® Antioxidant 330, Ethyl Corporation) was added. The solution was washed with 570 ml of water and the polymer recovered by coagulation by addition of the solution to 2.5 liters of methanol. The precipitated polymer was vacuum dried to give 235 grams of substituted polyphosphazene. Analysis by $^{31}$P NMR spectroscopy showed that the polymer contained 8 mole percent butoxy groups.

EXAMPLE 2

In the same autoclave was placed 288.5 grams of a solution of sodium phenoxide (450 meq) in THF/cyclohexane (1.4:1), 912.2 grams of a solution of sodium phenoxide (675 meq) and sodium p-ethylphenoxide (675 meq) in THF/cyclohexane and 194.2 grams of a solution of sodium n-butoxide (400 meq) in n-butanol. The mixture was stirred and then 685.7 grams of a 16.9 weight percent solution of poly(dichloro)phosphazene (2.0 eq.) in cyclohexane was added rapidly. An additional 320 grams of THF was used to assist in the transfer of the polymer solution. The autoclave was pressurized to 100 psig with nitrogen and heated to 150° C. The mixture was stirred for 18 hours at this temperature and then cooled and the contents removed. The solution was stirred vigorously while adding 9.8 grams of sulfuric acid in 250 ml of water. The aqueous phase was separated and discarded and the polymer was recovered from the solution by coagulation by adding the solution to isopropanol. The coagulated polymer was redissolved in THF and the solution was centrifuged to remove residual salt. The polymer was again coagulated by addition to isopropanol and the polymer was separated and dried under vacuum at 50° C. to give 215 grams of dried polymer. The polymer was analyzed by $^{31}$P NMR spectroscopy and found to contain 17.1 mole percent butoxy groups.

EXAMPLE 3

In the same 5 liter autoclave was placed 434 grams of a solution of sodium phenoxide (450 meq) in THF/cyclohexane (1.4:1), 617.8 grams of a solution of sodium phenoxide (457 meq) and sodium p-ethylphenoxide (457 meq) in THF/cyclohexane and 270.3 grams of a solution of sodium n-butoxide (600 meq) in n-butanol. The mixture was stirred and 685.7 grams of a 16.9 weight percent solution of poly(dichloro)phosphazene (2.0 eq.) in cyclohexane was added rapidly. An additional 350 grams of THF was used to assist in the transfer. The autoclave was pressurized to 100 psig with nitrogen and heated to 150° C. The mixture was stirred for 18 hours at this temperature and then cooled and discharged from the autoclave. The solution was neutralized by adding 9.8 grams of sulfuric acid in 385 ml of water. The aqueous phase was discarded and the organic phase was washed with 200 ml of additional water. The polymer was recovered by addition of the solution to 2.5 volumes of isopropanol which coagulated the gum. The gum was redissolved in 2 liters of THF and centrifuged to remove residual salt. The polymer was again recovered by coagulation in 2.5 volumes of isopropanol. The gum was washed with methanol and dried under vacuum at 60° C. to give 202 grams of polymer. The polymer was analyzed by $^{31}$P NMR spectroscopy and found to contain 27.4 mole percent butoxy groups.

EXAMPLE 4

This example shows the preparation of a high-alkoxy polyaryloxy phosphazene outside the scope of the present invention and is for comparitive purposes only.

In the stainless steel autoclave used in the previous examples, was placed 685.7 grams of a 16.9 weight percent solution of a high molecular weight linear polyphosphonitrilic chloride (LVN 0.65). The solution contained 115.89 grams of the polyphosphonitrilic chloride which represented 2.0 equivalents of Cl. An additional 320 grams of THF was used to rinse the polymer into the autoclave. In a separate vessel was placed 75.9 grams of a THF/cyclohexane solution containing 120 meq of sodium phenoxide, 729.7 grams of a THF/cyclohexane solution containing 540 meq of sodium phenoxide and 540 meq of sodium p-ethylphenoxide and 450.4 grams of a n-butanol solution containing 1,000 meq of sodium n-butoxide. The resultant aryloxide/alkoxide solution was added rapidly to the stirred polyphosphonitrilic chloride solution. The temperature rose from 25° to 46° C. The autoclave was sealed and pressurized with nitrogen to 50 psig and heated to 150° C. The mixture was stirred 16 hours at this temperature at which time the contents were cooled and discharged. A 50 ml aqueous solution containing 9.8 grams of sulfuric acid was added to neutralize the solution. A clear solution containing a white precipitate resulted. The mixture was centrifuged to remove the white precipitate and the clear liquid was poured into 3 volumes of a 90:10 isopropanol/water solution which had been acidified with $H_2So_4$ to pH 1.0. The substituted polyphosphazene precipitated and was separated. The polymer was again dissolved in 2 liters of THF and this solution was poured into 2.5 volumes of methanol causing the polymer to again coagulate in the form of polymer crumb. The crumb was removed and washed with methanol and then vacuum dried at 50° C. overnight yielding 188 grams of dry polyphosphazene. Analysis by $^{31}$P NMR showed 47.5 mole percent butoxy substitution and the balance aryloxy substitution.

Each of the above polyphosphazene gums was compounded and cured to produce a cured polyphosphazene composition. This was accomplished by mixing the formulation shown below (except for the peroxide curing agent) for about 3 minutes in a high intensity mixer (Brabender internal mixer) pre-heated to 46° C.

TABLE 1

|  | Parts by Weight |
| --- | --- |
| Polyphosphazene gum | 100 |
| Hydrated alumina[1] | 60 |
| Magnesium oxide[2] | 30 |
| Silicone-treated silica[3] | 10.7 |
| Antioxidant[4] | 0.5 |
| Peroxide curing agent[5] | 1.25 |

[1]Alcoa brand hydrated alumina.
[2]Ten parts Elastomag 170 brand and 20 parts Mg(OH)$_2$, Morton Chemical.
[3]Gamma-methacryloxypropyltrimethylsilane (Natrochem) on diatomaceous silica (Micro-Cel E).
[4]1,2-dihydro-2,2,4-trimethylquinoline (R. T. Vanderbilt Co.)
[5]40% α, α'-bis(tert-butylperoxy)diisopropylbenzene (Hercules) on clay (Burgess KE).

The blend was then placed on a 2-roll mill and the curing agent was sprinkled evenly on the resultant polymer sheet. The sheet was repeatedly passed through the 2-roll mill with folding between each pass to uniformly distribute the curing agent throughout the compounded gum. The compound was then cured in a laboratory press at 40,000 psi at 350° F. for 30 minutes. The thickness of the cured specimens varied somewhat as follows: Example 1, 40 mils; Example 2, 75 mils; Example 3, 76 mils; Example 4, 66 mils. Smoke density of the test specimens was measured using the standard NFPA-258-76 and the ANSI/ASTM E662-79 test methods. The following properties were determined:

TABLE 2

| Polyphosphazene Source | Mole % Butoxy | Tg °C.[1] | DM[2] |
|---|---|---|---|
| Example 1 | 8.0 | −26 | 83 |
| Example 2 | 17.1 | −40 | 105 |
| Example 3 | 27.4 | −50 | 152 |
| Example 4 | 47.5 | −61 | 275 |

[1] Glass transition temperature
[2] Maximum smoke density during 20 minute test period.

As the results show the specimens made from high alkoxy polyaryloxy phosphazene gave a very high smoke value (Dm=275). However, the low alkoxy polyaryloxy phosphazenes of this invention gave sharply lower smoke values (Dm=83 to 152). At the same time the Tg values stayed in the −26° to −50° C. range which is considered satisfactory in most low temperature applications.

The cured polyphosphazene compositions of this invention can be used in all applications which require a non-burning, low-smoke flexible polymer. One main application is as wire and cable electrical insulation in which the compounded polyphosphazene is extruded around the wire and cable and then heated or irradiated to cure the coating.

In compounding the polyphosphazene gums of the present invention, an important ingredient is the inorganic fillers. In some compositions the amount of inorganic filler is equal or greater than the amount of polyphosphazene gum. A useful range of such fillers is from about 30 to 120 parts by weight for each 100 parts by weight polyphosphazene gum. Examples of such fillers include clay, talc, mica, asbestos, feldspar, bentonite, wollastonite, fullers earth, pumice, pyrophillite, rottenstone, slate flour, vermicullite, calcium silicate, magnesium silicate, alumina, hydrated alumina, antimony oxide, magnesia, titania, zinc oxide, silica, calcium carbonate, barium carbonate, magnesium carbonate, magnesium hydroxide, barium sulfate, calcium sulfate, lime, carbon black, graphite, metal powders, fibers and whiskers, barium ferrite, magnetite, molybdenum disulfide, glass fibers or flakes, ground glass and the like.

The compounded formulations can also include a plasticizer. These can be liquid which when blended with the polyphosphazene gum and other components tend to reduce the viscosity of the mass and assist in making a homogenous blend. Useful plasticizers include tricresylphosphate, triphenylphosphate, cresyldiphenylphosphate, butyl octyl phthalate, dibutyl phthalate, dicyclohexyl phthalate, diisodecyl phthalate, di-2-ethylhexyl phthalate, di-tridecyl phthalate, isooctylisodecyl phthalate, diisodecyl adipate, di-2-ethylhexyl adipate, octyldecyl adipate, diisobutyl adipate, diisooctyl adipate, di-2-ethylhexyl azelate, diisodecyl azelate, dibutyl maleate, glycerol ricinoleate, isopropyl myristate, isopropyl palmitate, butyl oleate, glycerol trioleate, methyl oleate, 2-ethylhexyl oleate, dibutyl sebacate, di-2-ethylhexyl sebacate, butyl stearate, 2-ethylhexyl stearate, triethyleneglycol dicaprate, ethylene glycol terephthalate polyesters, diethylene glycol dipelargonate, polyethylene glycol 200 dibenzoate, polyethylene glycol 600 dibenzoate, glycerol triacetylricinoleate, adipic acid glycol polyester 6,000 and the like.

Curing agents used to cure the compounded polymer are the conventional radical generating curing agents which include peroxide and azo compounds. Such curing agents are commercially available.

Other conventional adjuvants can be included in the compounded polyphosphazene compositions. These include various processing aids such as certain silicones and silicone treated fillers.

We claim:

1. A peroxide cured polyphosphazene composition having a non-flaming smoke rating below about 200 Dm as measured by the AMSI/ASTM E 662-79 method on a test specimen 76 mills thick, said composition comprising a cured polyphosphazene gum containing about 30-120 parts by weight of inorganic filler for each 100 parts of polyphosphazene and optionally other conventional compounding ingredients, said polyphosphazene gum having a $-P<=N)_n$ backbone in which n has an average value of about 100–1,000,000 or more and the phosphorus substituents comprise about 20–80 mole percent phenoxy, 20–80 mole percent lower alkylphenoxy and 2–30 mole percent alkoxy and said substituents are randomly distributed along said backbone.

2. A polyphosphazene composition of claim 1 wherein said alkoxy substituents contain about 1–8 carbon atoms.

3. A polyphosphazene composition of claim 2 wherein said lower alkylphenoxy substituents are lower p-alkylphenoxy substituents.

4. A polyphosphazene composition of claim 3 wherein said lower p-alkylphenoxy substituents are mainly p-ethylphenoxy groups.

5. A polyphosphazene composition of claim 4 wherein said alkoxy substituents are n-butoxy groups.

6. A polyphosphazene gum suitable for use in making a low-smoke, peroxide cured aryloxy-alkoxy substituted polyphosphazene composition of claim 1, said polyphosphazene gum having a substantially linear $-P<=N)_n$ backbone wherein n has an average value of about 100–1,000,000 or more and the phosphorus substituents comprise about 20–80 mole percent phenoxy, 20–80 mole percent lower alkylphenoxy and 2–30 mole percent alkoxy.

7. A polyphosphazene gum of claim 6 wherein said alkoxy substituents contain about 1–8 carbon atoms.

8. A polyphosphazene gum of claim 7 wherein said lower alkylphenoxy substituents are lower p-alkylphenoxy substituents.

9. A polyphosphazene gum of claim 8 wherein said lower p-alkylphenoxy substituents are mainly p-ethylphenoxy groups.

10. A polyphosphazene gum of claim 9 wherein said alkoxy substituents are n-butoxy groups.

11. A polyphosphazene composition of claim 9 wherein the substituents are about 30–70 mole percent phenoxy, 30–70 mole percent p-ethylphenoxy and 10–25 mole percent lower alkoxy.

12. A polyphosphazene gum of claim 11 wherein said alkoxy substituents are n-butoxy groups.

* * * * *

UNITED STATES PATENT AND TRADEMARK OFFICE
CERTIFICATE OF CORRECTION

PATENT NO. : 4,567,229
DATED : JANUARY 28, 1986
INVENTOR(S) : F. ALEXANDER PETTIGREW and HAROLD R. PENTON It is certified that error appears in the above-identified patent and that said Letters Patent is hereby corrected as shown below:

Column 1, line 7, reads "-P<=N-" and should read -- $-(P=N)-$ --.

Column 1, line 51, reads "-P<=N)$_n$" and should read -- $-(P=N)_n-$ --.

Column 6, line 23, reads "-P<=N)$_n$" and should read -- $-(P=N)_n-$ --.

Column 6, line 44, reads "-P<=N)$_n$" and should read -- $-(P=N)_n-$ --.

Signed and Sealed this

Fifteenth Day of April 1986

[SEAL]

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,567,229

DATED : JANUARY 28, 1986

INVENTOR(S) : F. ALEXANDER PETTIGREW and HAROLD R. PENTON

It is certified that error appears in the above-identified patent and that said Letters Patent is hereby corrected as shown below:

Column 1, line 45, reads "AMSI/ASTM" and should read
-- ANSI/ASTM --.

Column 6, Claim 1, line 17, reads "AMSI/ASTM" and should
read -- ANSI/ASTM --.

Signed and Sealed this

Third Day of June 1986

[SEAL]

Attest:

DONALD J. QUIGG

Attesting Officer

Commissioner of Patents and Trademarks